United States Patent
Kaiduka et al.

(10) Patent No.: US 12,230,767 B2
(45) Date of Patent: Feb. 18, 2025

(54) NON-AQUEOUS ELECTROLYTE SECONDARY BATTERY AND METHOD FOR MANUFACTURING NON-AQUEOUS ELECTROLYTE SECONDARY BATTERY

(71) Applicant: Panasonic Intellectual Property Management Co., Ltd., Osaka (JP)

(72) Inventors: Atsushi Kaiduka, Osaka (JP); Noriko Sugii, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 620 days.

(21) Appl. No.: 17/435,532

(22) PCT Filed: Mar. 6, 2020

(86) PCT No.: PCT/JP2020/009590
§ 371 (c)(1),
(2) Date: Sep. 1, 2021

(87) PCT Pub. No.: WO2020/184417
PCT Pub. Date: Sep. 17, 2020

(65) Prior Publication Data
US 2022/0149438 A1    May 12, 2022

(30) Foreign Application Priority Data
Mar. 13, 2019 (JP) ................... 2019-045841

(51) Int. Cl.
*H01M 10/0587* (2010.01)
*H01M 50/409* (2021.01)
(Continued)

(52) U.S. Cl.
CPC ..... *H01M 10/0587* (2013.01); *H01M 50/409* (2021.01); *H01M 50/469* (2021.01);
(Continued)

(58) Field of Classification Search
CPC ........... H01M 10/052; H01M 10/0525; H01M 10/0587; H01M 50/107; H01M 50/403;
(Continued)

(56) References Cited

U.S. PATENT DOCUMENTS

| | | |
|---|---|---|
| 2011/0045356 A1 | 2/2011 | Fujiwara et al. |
| 2011/0159344 A1 | 6/2011 | Kobayashi et al. |
| 2014/0197796 A1 | 7/2014 | Sasaki et al. |

FOREIGN PATENT DOCUMENTS

| | | |
|---|---|---|
| EP | 2755258 A1 | 7/2014 |
| JP | 11-26021 A | 1/1999 |

(Continued)

OTHER PUBLICATIONS

International Search Report dated Jun. 9, 2020, issued in counterpart International Application No. PCT/JP2020/009590 (3 pages).

(Continued)

*Primary Examiner* — Victoria H Lynch
(74) *Attorney, Agent, or Firm* — WHDA, LLP

(57) ABSTRACT

The purpose of the present disclosure is to provide a non-aqueous electrolyte secondary battery capable of suppressing an internal short circuit of a battery due to an external impact in both a fully charged state and a non-fully charged state. The non-aqueous electrolyte secondary battery according to one embodiment of the present disclosure is characterized by: comprising a wound electrode body in which a positive electrode and a negative electrode are wound thereon via a separator, and a battery case that houses the electrode body; the positive electrode having a positive electrode current collector and a positive electrode mixture layer formed on at least one surface of the positive electrode current collector; and the separator having a normal part and a plastically deformed part having a higher puncture strength than the normal part.

8 Claims, 7 Drawing Sheets

(51) Int. Cl.
  *H01M 50/469* (2021.01)
  *H01M 50/571* (2021.01)
  *H01M 10/0525* (2010.01)
  *H01M 50/489* (2021.01)
  *H01M 50/586* (2021.01)

(52) U.S. Cl.
  CPC ...... *H01M 50/571* (2021.01); *H01M 10/0525* (2013.01); *H01M 50/489* (2021.01); *H01M 50/586* (2021.01)

(58) Field of Classification Search
  CPC ............. H01M 50/409; H01M 50/417; H01M 50/469; H01M 50/489; H01M 50/531; H01M 50/571; H01M 50/586; Y02E 60/10; Y02P 70/50
  See application file for complete search history.

(56) References Cited

FOREIGN PATENT DOCUMENTS

| | | |
|---|---|---|
| JP | 2002-324570 A | 11/2002 |
| JP | 2007-134149 A | 5/2007 |
| JP | 2010-3685 A | 1/2010 |
| JP | 2011-138632 A | 7/2011 |
| JP | 2014-139865 A | 7/2014 |
| JP | 2014-232703 A | 12/2014 |

OTHER PUBLICATIONS

The Extended European Search Report dated May 10, 2022, issued in counterpart EP Application No. 20769658.4. (7 pages).
Office Action dated Apr. 19, 2024, issued in counterpart EP Application No. 20769658.4. (5 pages).
English Translation of Chinese Office Action dated Sep. 9, 2024, issued in counterpart CN application No. 202080020490.5. (4 pages).

NON-AQUEOUS ELECTROLYTE SECONDARY BATTERY AND METHOD FOR MANUFACTURING NON-AQUEOUS ELECTROLYTE SECONDARY BATTERY

TECHNICAL FIELD

The present disclosure relates to a non-aqueous electrolyte secondary battery and a method for producing a non-aqueous electrolyte secondary battery.

BACKGROUND ART

So far, a non-aqueous electrolyte secondary battery including a wound-type electrode assembly and a metal battery case housing the electrode assembly has been widely used, the electrode assembly including a beltlike positive electrode and a beltlike negative electrode wound together with a separator interposed therebetween. Patent Literature 1 discloses a non-aqueous electrolyte secondary battery in which thermal runaway of the battery due to impact from the outside is suppressed in a state of full charge by using a separator having a predetermined tensile strength at break.

CITATION LIST

Patent Literature

PATENT LITERATURE 1: Japanese Unexamined Patent Application Publication No. 2014-139865

SUMMARY

Technical Problem

In Patent Literature 1, there is, however, no consideration about an influence on a non-aqueous electrolyte secondary battery in a state of non-full charge when the battery is subjected to impact from the outside.

It is an advantage of the present disclosure to provide a non-aqueous electrolyte secondary battery in which internal shorts thereof due to impact from the outside is suppressed both in a state of full charge and that of non-full charge.

Solution to Problem

A non-aqueous electrolyte secondary battery of one aspect of the present disclosure comprises: a wound-type electrode assembly including a positive electrode and a negative electrode wound together with a separator interposed therebetween; and a battery case housing the electrode assembly, characterized in that the positive electrode has a positive electrode current collector and a positive electrode mixture layer formed on at least one face of the positive electrode current collector, and that the separator has a normal region and a plastically deformed region having a puncture strength larger than that of the normal region.

A method of another aspect of the present disclosure for producing a non-aqueous electrolyte secondary battery is a method for producing a non-aqueous electrolyte secondary battery comprising: a wound-type electrode assembly including a positive electrode and a negative electrode wound together with a separator interposed therebetween, and a battery case housing the electrode assembly, characterized in that the method includes stretching part of the separator in a winding direction when winding the positive electrode and the negative electrode together with the separator interposed therebetween, to thereby plastically deform the part of the separator.

Advantageous Effects of Invention

The non-aqueous electrolyte secondary battery according to the present disclosure can withstand impact from the outside both in a state of full charge and that of non-full charge to suppress internal shorts.

DESCRIPTION OF EMBODIMENTS

A non-aqueous electrolyte secondary battery of an exemplary embodiment according to the present disclosure will now be described in detail with reference to drawings. In the descriptions below, specific shapes, materials, values, directions, and others are illustrative for easy appreciation of the present disclosure, and can be appropriately changed according to the specifications of the non-aqueous electrolyte secondary battery. When a plurality of embodiments and modification examples are included in the descriptions below, appropriate combination use of the features thereof are assured from the beginning.

Figure 1:
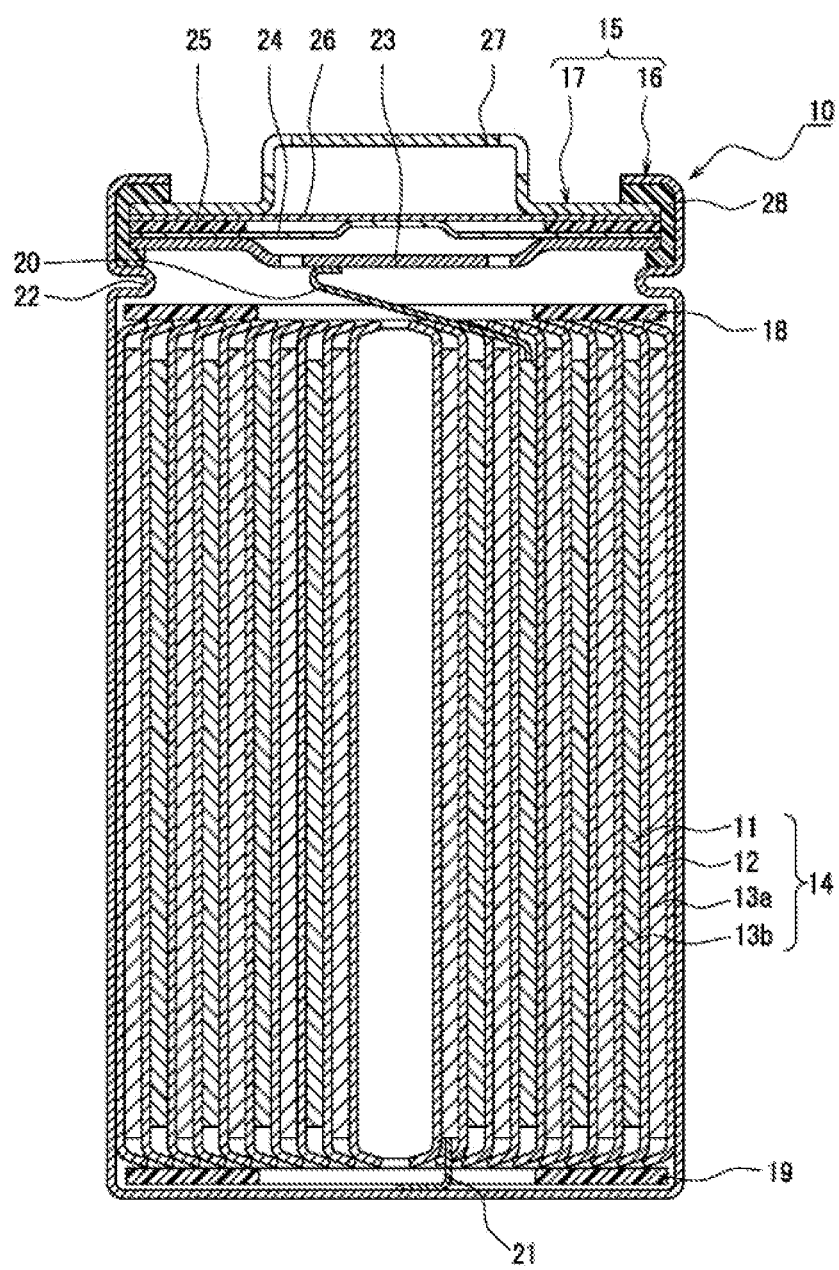
FIG. 1 is a vertical sectional view illustrating a non-aqueous electrolyte secondary battery of an exemplary embodiment.

FIG. 1 is a vertical sectional view illustrating a non-aqueous electrolyte secondary battery 10 of an exemplary embodiment. In the non-aqueous electrolyte secondary battery 10, an electrode assembly 14 and a non-aqueous electrolyte (not shown) are housed in a battery case 15, as shown in FIG. 1. As a non-aqueous medium (organic medium) for the non-aqueous electrolyte, a carbonate, a lactone, an ether, a ketone, an ester, or the like can be used, and two or more of these medium can be mixed and used. Examples of the medium used include a cyclic carbonate such as ethylene carbonate, propylene carbonate, and butylene carbonate, a chain carbonate such as dimethyl carbonate, ethyl methyl carbonate, and diethyl carbonate, and a mixed medium of the cyclic carbonate and the chain carbonate. As an electrolyte salt for the non-aqueous electrolyte, $LiPF_6$, $LiBF_4$, $LiCF_3SO_3$, or the like and a mixture thereof can be used, for example. The amount of the electrolyte salt dissolved in the non-aqueous medium can be, for example, 0.5 to 2.0 mol/L.

The battery case 15 is composed of a package 16 and a sealing assembly 17. Insulating plates 18 and 19 are provided above and under, respectively, the electrode assembly 14. A positive electrode lead 20 passes through a through-hole in the insulating plate 18 and extends toward the sealing assembly 17, and the positive electrode lead 20 is welded to the lower face of a filter 23 as a bottom plate of the sealing assembly 17. In the non-aqueous electrolyte secondary battery 10, a cap 27, which is a top plate of the sealing assembly 17 and electrically connected to the filter 23, serves as a positive electrode terminal. On the other hand, a negative electrode lead 21 passes through a through-hole in the insulating plate 19 and extends toward the bottom side of the package 16. The negative electrode lead 21 is welded to the inner surface of the bottom of the package 16. The package 16 serves as a negative electrode terminal in the non-aqueous electrolyte secondary battery 10. In a case where the negative electrode lead 21 is provided near the outer end of winding, the negative electrode lead 21 extends on the outside of the insulating plate 18 toward the bottom side of the battery case 15 and is welded to the inner surface of the bottom of the battery case 15.

The package 16 is a cylindrical metal container having a closed-end. A gasket 28 is provided between the package 16 and the sealing assembly 17 to ensure that the battery case is tightly sealed. The package 16 includes a projecting portion 22 formed by, for example, pressing the lateral surface from outside to support the sealing assembly 17. The projecting portion 22 is preferably formed annularly along the circumferential direction of the package 16, and the upper surface thereof supports the sealing assembly 17.

The sealing assembly 17 includes the filter 23, a lower vent member 24, an insulating member 25, an upper vent member 26, and the cap 27, these members being superposed in this order from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at their middle portions and the insulating member 25 is interposed therebetween at their circumferences. If the internal pressure of the battery increases due to abnormal heat generation, the lower vent member 24 ruptures, for example, whereby the upper vent member 26 swells up toward the cap 27 to separate from the lower vent member 24, and thus the electrical connection between the lower vent member 24 and the upper vent member 26 is broken. If the internal pressure further increases, the upper vent member 26 ruptures to discharge gas through the opening of the cap 27.

Figure 2:
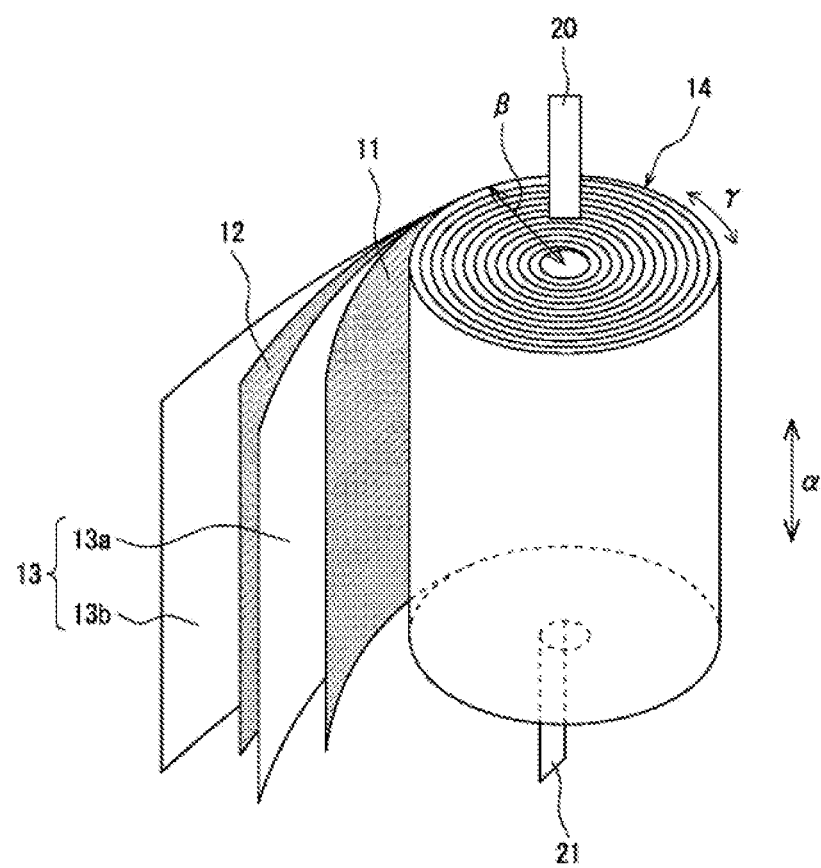
FIG. 2 is a perspective view of the wound-type electrode assembly in the non-aqueous electrolyte secondary battery shown in FIG. 1.

The electrode assembly 14 will be described below with reference to FIG. 2. FIG. 2 is a perspective view of the wound-type electrode assembly 14 in the non-aqueous electrolyte secondary battery 10 shown in FIG. 1. The electrode assembly 14 has a wound structure in which a positive electrode 11 and a negative electrode 12 are wound together with the first separator 13a and the second separator 13b interposed therebetween. The positive electrode 11, the negative electrode 12, the first separator 13a, and the second separator 13b all have a beltlike shape, and are wound into a spiral shape around the center of winding (hereinafter sometimes referred to as the winding axis) of the electrode assembly 14, whereby they reach the state in which they are alternately superposed in the radial direction $\beta$ of the electrode assembly 14. Hereinafter, the first separator 13a and the second separator 13b are sometimes collectively referred to as a separator 13. In the electrode assembly 14, the longitudinal direction of the positive electrode 11 and that of the negative electrode 12 match the winding direction $\gamma$, and the lateral direction of the positive electrode 11 and that of the negative electrode 12 match the winding axial direction $\alpha$. Hereinafter, the longitudinal direction of the positive electrode 11 and that of the negative electrode 12 are sometimes referred to as the longitudinal direction $\gamma$. The inner side of winding means the side on the winding axis in the radial direction $\beta$, and the outer side of winding means the outer side of the electrode assembly 14 in the radial direction $\beta$.

As shown in FIG. 2, the first separator 13a is provided on the outer side of winding of the positive electrode 11, and the second separator 13b is provided on the outer side of winding of the negative electrode 12 (on the inner side of the winding of the positive electrode 11). The first separator 13a and the second separator 13b are each interposed between the positive electrode 11 and the negative electrode 12 to thereby insulate the positive electrode 11 and the negative electrode 12 from each other. In addition, the separator 13 protects the positive electrode 11 and the negative electrode 12 from impact from the outside. The separator 13 may be composed of two sheets or may be a single sheet. The first separator 13a and the second separator 13b may be the same or different from each other.

Figure 3:
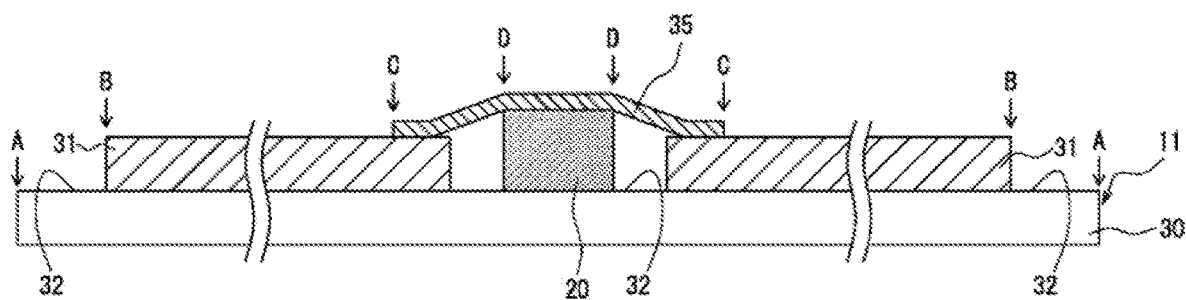
FIG. 3 is a longitudinal sectional view of the positive electrode in an exemplary embodiment.

Next, the positive electrode 11 will be described in detail with reference to FIG. 3. FIG. 3 is a longitudinal sectional view of the positive electrode 11 in an exemplary embodiment.

The positive electrode 11 has a beltlike positive electrode current collector 30 and a positive electrode mixture layer 31 formed on at least one face of the positive electrode current collector 30. In other words, the positive electrode 11 has a positive electrode mixture layer 31 including a positive electrode active material on at least one face thereof. The positive electrode mixture layer 31 is preferably formed on each of both faces of the positive electrode current collector 30. As the positive electrode current collector 30, foil of a metal such as aluminum, a film with such a metal disposed as an outer layer, or the like can be used. A preferable positive electrode current collector 30 is metal foil including aluminum or an aluminum alloy as a main component. The thickness of the positive electrode current collector 30 is, for example, 10 μm to 30 μm.

The positive electrode mixture layer 31 preferably includes a positive electrode active material, a conductive agent, and a binder. The positive electrode 11 is prepared by, for example, applying a positive electrode slurry including the positive electrode active material, the conductive agent, the binder, and a solvent such as N-Methyl-2-pyrrolidone (NMP) to both faces of a positive electrode current collector 30, and then drying and pressing the resultant.

Examples of the positive electrode active material include a lithium-containing complex oxide also containing a transition metal element such as Co, Mn, and Ni. The lithium-containing complex oxide is preferably, but not limited thereto, a complex oxide represented by a general formula $Li_{1+x}MO_2$, wherein $-0.2<x<0.2$ and M includes at least one of Ni, Co, Mn, and Al.

Examples of the conductive agent include carbon materials such as carbon black (CB), acetylene black (AB), Ketjenblack, and graphite. Examples of the binder include fluororesins, such as polytetrafluoroethylene (PTFE) and poly(vinylidene fluoride) (PVdF), polyacrylonitrile (PAN), polyimide (PI), acrylic resins, and polyolefin resins. These resins may be used in combination with, for example, carboxymethyl cellulose (CMC) or a salt thereof, or polyethylene oxide (PEO). These may be used singly or in combinations of two or more thereof.

Figure 4:
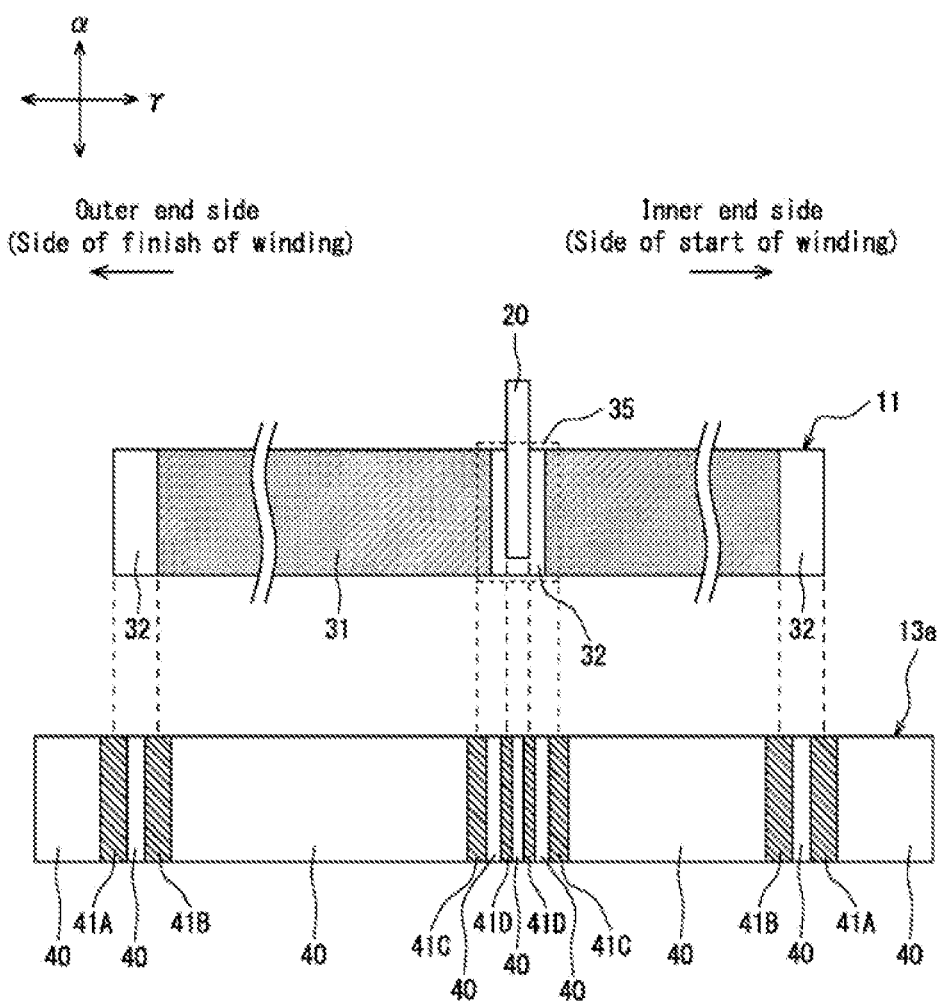
FIG. 4 is a plan view illustrating the relation of the positive electrode and the separator facing each other in the electrode assembly in an exemplary embodiment.

In the positive electrode 11, a positive electrode-exposed region 32 is provided, in which no positive electrode mixture layer 31 is formed to allow the surface of the positive electrode current collector 30 to be exposed. The number of the positive electrode-exposed regions 32 may be one or more. A positive electrode lead 20 is connected to at least one positive electrode-exposed region 32. The number of positive electrode lead 20 may be one or more. FIG. 4 is a plan view illustrating the relation of the positive electrode 11 and the first separator 13a facing each other in the electrode assembly 14. As shown in FIG. 4, the positive electrode lead 20 faces to the first separator 13a, which is provided on the outer side of winding of the positive electrode 11. In other words, the positive electrode lead 20 is connected to the positive electrode-exposed region 32 on the outer side of winding of the positive electrode 11. At the position corresponding to the positive electrode-exposed region 32 to which the positive electrode lead 20 is connected, the positive electrode 11 preferably includes another positive electrode-exposed region 32 on the inner side of winding of the positive electrode 11. The positive electrode lead 20 may be connected to either the positive electrode-exposed region 32 on the outer side of winding of the positive electrode 11 or that on the inner side. The positive electrode lead 20 is connected to the positive electrode-exposed region 32 by, for example, ultrasonic welding. The constituent material for the positive electrode lead 20 is not particularly limited as long as it has conductivity, but the positive electrode lead 20 is preferably made of metal including aluminum as a main component.

For example, the positive electrode lead 20 can be provided in the central region of the positive electrode 11 in the longitudinal direction γ in view of current collection. In this case, the positive electrode lead 20 is connected to the positive electrode-exposed region 32 provided in the central region of the positive electrode 11 in the longitudinal direction γ, and when winding to prepare an electrode assembly 14, the positive electrode lead 20 is positioned at the middle in the radial direction β of the electrode assembly 14 while protruding from the end face in the winding axial direction α, as shown in FIG. 2. Alternatively, the positive electrode-exposed region 32 may be formed in a region other than the central region in the longitudinal direction γ of the positive electrode 11, and may be formed at a position closer to the end, for example. The positive electrode-exposed region 32 is provided by, for example, intermittent application in which no positive electrode slurry is applied to put of the positive electrode current collector 30.

As shown in FIG. 3, a protection number 35 is attached to the surface of the positive electrode lead 20. The protection member 35 is an insulating material for preventing short circuits of the positive electrode lead 20 and the positive electrode-exposed region 32 around the positive electrode lead 20 with a negative electrode mixture layer if the separator 13 is broken to allow the positive electrode lead 20 and the positive electrode-exposed region 32 around the positive electrode lead 20 to face the negative electrode mixture layer provided in the surface of the negative electrode 12 described later without the separator 13 interposed therebetween. The protection member 35 is preferably attached to the surface of the positive electrode mixture layer 31 so as to straddle the positive electrode lead 20 and the positive electrode-exposed region 32 around the positive electrode lead 20.

The protection member 35 has, for example, a substrate and an adhesive region formed on one face of the substrate. The substrate may be made of an insulating resin such as PPS (polyphenylene sulfide), PEEK (polyetheretherketone), PI (polyimide), PP (polypropylene), PET (polyethylene terephthalate), and PBT (polybutylene terephthalate). The thickness of the substrate is, for example, 5 μm or more and 50 μm or less, and preferably 10 μm or more and 30 μm or less.

The adhesive region is a region for attaching the protection member 35 to the surface of the positive electrode 11. The thickness of the adhesive region is, for example, 1 μm or more and 30 μm or less, and preferably 5 μm or more and 25 μm or less. The adhesive region may include at least one selected from rubber polymers and acrylic polymers. Since rubber polymers and acrylic polymers have adhesiveness, they can attach the protection member 35 to the surface of the positive electrode 11. The adhesive region may further include a silicone polymer, for example.

As shown in FIG. 3, the positive electrode 11 has corners. If the battery is subjected to impact, the separator 13 may be broken from the position facing the corner as an originating point. Specific examples of the corers include the inner end and the outer end of the positive electrode 11 (hereinafter sometimes referred to as a corner A), the inner end and the outer end of the positive electrode mixture layer 31 (hereinafter sometimes referred to as a corner B), both lateral ends of the protection member 35 (hereinafter sometimes referred to as a corner C), and both lateral ends of the positive electrode lead 20 (hereinafter sometimes referred to as a corner D). The inner end and the outer end here mean the end on the side of the start of winding and that of the finish of winding, respectively, of each of the positive electrode 11 and the negative electrode 12. In a case where positive electrode-exposed regions 32 adjacent to the inner end and the outer end of the positive electrode 11 are not formed, the inner end and the outer end of the positive electrode mixture layer 31 correspond to the inner end and the outer end of the positive electrode 11, respectively. In addition to the corners A to D, any step generated in the surface of the positive electrode 11 may be regarded as the corners.

An ion-permeable and insulating porous sheet is used as the separator 13. Specific examples of the porous sheet include a microporous thin film, woven fabric, and nonwoven fabric. Examples of the material for the separator 13 to be used include polyolefin resins such as polyethylene and polypropylene. The thickness of the separator 13 is, for example, 8 μm to 50 μm, and preferably 10 μm to 20 μm. The separator 13 has a melting point of about 130° C. to 180° C., for example. The separator 13 may have, for example, an aramid coating formed on a face thereof in view of improvement in heat resistance etc.

The separator 13 is prepared by forming a polyolefin resin into a sheet by extrusion, and then drawing the sheet in the machine direction (MD) and the transverse direction (TD) simultaneously or successively to thin the sheet. The separator 13 prepared is wound to obtain a separator roll 54 (see FIG. 5). Drawing allows the molecules of the polyolefin resin to orient and crystallize to thereby improve the puncture strength of the separator 13. On the other hand, a polyolefin resin has an acceptable drawing ratio peculiar thereto, and drawing for thinning results in a smaller percent elongation of the separator 13 after thinning. Thus, the percent elongation and the puncture strength of the separator 13 have a relation of trade-off.

As shown in FIG. 4, the first separator 13a has a normal region 40 and a plastically deformed region 41 having a puncture strength larger than that of the normal region 40. The behavior of internal shorts of the battery when subjected to impact from the outside is different between a case of a battery in a state of full charge and a case of a battery in a state of non-full charge. In a state of full charge, because the electrode assembly 14 is in a maximum expanding state, clearance between the electrode assembly 14 and the package 16 is small, and therefore, the acceptable degree of deformation of the electrode assembly 14 is small when the battery is subjected to impact from the outside. In such a case, the separator 13 tends to be locally compressed by the corner as shown in FIG. 3 to be broken, which may cause internal shorts. Accordingly, the plastically deformed region 41 is preferably provided at a position at which the local compression of the separator 13 is anticipated when the battery is subjected to impact from the outside, as shown in FIG. 4. Internal shorts is suppressed by such a configuration when the battery in a state of full charge is subjected to impact from the outside. On the other hand, because the electrode assembly 14 in a state of non-full charge is in a contracting state as compared with that in a state of fil charge, clearance between the electrode assembly 14 and the package 16 is large, and therefore, the acceptable degree of deformation of the electrode assembly 14 is large when the battery is subjected to impact from the outside. In such a cam, tensile strength may be applied to the separator 13 with the deformation of the electrode assembly 14 to thereby broken the separator, which may cause internal shorts. Since the percent elongation and the puncture strength of the separator 13 have a relation of trade-off as described above, the normal region 40 has a larger percent elongation than that of the plastically deformed region 41, and the breakage of the separator 13 due to the tensile strength is thus suppressed. Internal shorts is suppressed by such a configuration when the battery in a state of non-full charge is subjected to impact from the outside. By the separator 13 including the normal region 40 and the plastically deformed region 41, internal shorts of the battery is suppressed in both of a state of full charge and that of non-full charge when the battery is subjected to impact from the outside.

The measurement of the puncture strength is carried out in accordance with JIS Z-1707. A sample (separator 13) for measuring the puncture strength is fixed and pierced with a semicircular needle having a diameter of 1.0 mm and a tip diameter of 0.5 mm at a rate of 50±5 mm/min, and the maximum stress until the needle pierces was measured. The measurement is made on randomly selected five samples for measuring the puncture strength, and the average of the measurement results is used as the puncture strength of the separator 13.

The measurement of the percent elongation in the winding axial direction α is carried out in accordance with JIS K-7127. The first separator 13a and the second separator 13b are each cut to prepare five specimens for measuring the percent elongation, the specimen having a width of 10 mm and a length of 150 mm or more. The specimen for measuring the percent elongation is fixed on jigs so that the longitudinal direction of the specimen matches the axis of the tester with a distance between a pair of jigs of 100 mm, and the tensile strength and the elongation when the specimen for measuring the percent elongation is stretched at 200 mm/min are measured to determine the percent elongation in the winding axial direction α. The tensile strength at break (hereinafter sometimes referred to as breaking strength) is also measured. The measurements are made on five specimens for measuring the percent elongation, and for the measurement results of all items, the average of three found values, one maximum found value and one minimum found value excluded, is used.

The first separator 13a may have a plastically deformed region 41A at a position facing at least one of the corners A of the inner end and that of the outer end of the positive electrode 11. When the battery is subjected to impact from the outside, the corner A may compress locally the first separator 13a to break through it. Accordingly, when the plastically deformed region 41A, which has a puncture strength larger than that of the normal region 40, is arranged at a position facing the corner A, the first separator 13a is unlikely to be broken, whereby a risk of occurrence of internal shorts can be reduced. Also, in the second separator 13b, the plastically deformed region 41A may be provided at a position facing at least one of the corners A of the inner end and the outer end of the positive electrode 11.

The first separator 13a may have the plastically deformed region 41B at a position facing at least one of the corners B of the inner end and that of the outer end of the positive electrode mixture layer 31. The positive electrode mixture layer 31 includes a lithium-containing complex oxide, which is hard, as a positive electrode active material. Thus, when the battery is subjected to impact from the outside, the corner B may break through the first separator 13a. Accordingly, when the plastically deformed region 41B, which has a puncture strength larger than that of the normal region 40, is arranged at a position facing the corner B, the first separator 13a is unlikely to be broken, whereby a risk of occurrence of internal shorts can be reduced. In the case where the positive electrode mixture layer 31 is formed on each of both face of the positive electrode 11, the plastically deformed region 41B may be provided, also in the second separator 13b, at a position facing at least one of the corners B of the inner end and the outer end of the positive electrode mixture layer 31.

Since the plastically deformed region 41A and the plastically deformed region 41B are provided at positions relatively close to each other in the longitudinal direction γ of the positive electrode 11, the plastically deformed region 41A and the plastically deformed region 41B may be connected to form a single plastically deformed region 41. In this case, the number of the steps of plastically deforming can be reduced, and the method for forming the plastically deformed region 41, which will be described later, becomes thus simple.

The first separator 13 may have the plastically deformed region 41C at a position facing at least one of the corners C of both lateral ends of the protection member 35. When the battery is subjected to impact from the outside, the corner C may also break through the first separator 13a. Accordingly, when the plastically deformed region 41C, which has a puncture strength larger than that of the normal region 40, is arranged at a position facing the corner C, the first separator 13a is unlikely to be broken, whereby a risk of occurrence of internal shorts can be reduced. The position of the protection member 35 provided on the surface of the positive electrode 11 is not limited to the surface of the positive electrode lead 20, and the protection member 35 may be attached at another position. Also in such a case, the plastically deformed region 41C can be arranged at a position facing at least one of the corners C of both lateral ends of the protection member 35. In the case where the protection member 35 is attached to the inner side of winding of the positive electrode 11, the plastically deformed region 41C may be provided, also in the second separator 13b, at a position facing at least one of the corners C of both lateral ends of the protection member 35.

The first separator 13a may have the plastically deformed region 41D at a position facing at least one of the corners D of both lateral ends of the positive electrode lead 20. As shown in FIG. 3, the positive electrode lead 20 is thicker than the positive electrode mixture layer 31, and thus is a portion that protrudes most toward the first separator 13a in the surface of the positive electrode 11. Furthermore, the positive electrode lead 20 is difficult to curve when the positive electrode 11 is wound. Accordingly, a strong forth is applied particularly to the positions facing to both lateral ends of positive electrode lead 20 in the first separator 13a when the battery is subjected to impact from the outside. Accordingly, when the plastically deformed region 41D is formed at a position facing the corner D in the first separator 13a as shown in FIG. 4, the first separator 13a is unlikely to be broken, whereby a risk of occurrence of internal shorts can be reduced. In the case where the positive electrode lead 20 is provided on the inner side of winding of the positive electrode 11, the plastically deformed region 41D may be provided, also in the second separator 13b, at a position facing at least one of the corners D of both lateral ends of the positive electrode lead 20.

Since the plastically deformed region 41C and the plastically deformed region 41D are provided at positions relatively close to each other in the longitudinal direction γ of the positive electrode 11, the plastically deformed region 41C and the plastically deformed region 41D may be connected to form a single plastically deformed region 41. In this case, the number of the steps of plastically deforming can be reduced, and the method for forming the plastically deformed region 41C and the plastically deformed region 41D, which will be described later, becomes thus simple.

The first separator 13a in FIG. 4 has the plastically deformed regions 41A, 41B, 41C, and 41D. However, the first separator 13a may have only one of the plastically deformed regions 41A, 41B, 41C, and 41D or may have a plurality thereof selectively. If it is supposed that the first separator 13a is locally compressed by the positive electrode 11 at any other position in addition to the positions facing the corners A, B, C, and D shown in FIG. 3, a plastically deformed region 41 may be provided at that position. The same also applies to the second separator 13b.

Figure 5:
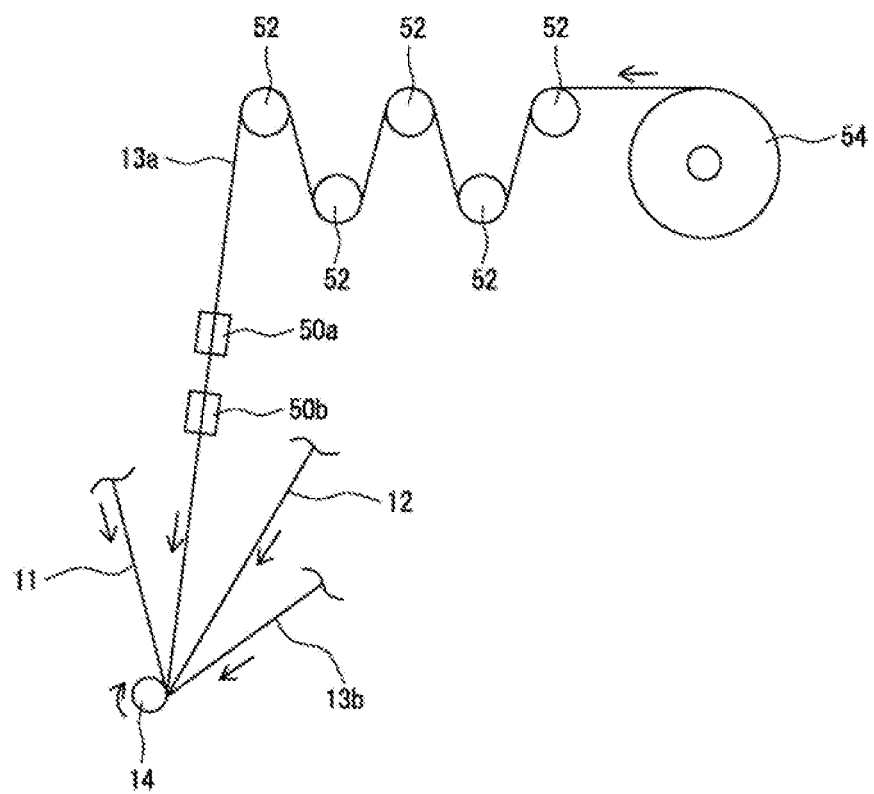
FIG. 5 is a front view illustrating the configuration of a device for winding the electrode assembly of an exemplary embodiment.

Next, an exemplary method for forming the plastically deformed region 41 will be described with reference to FIGS. 5 and 6. FIG. 5 is a front view illustrating the configuration of a device for winding the electrode assembly 14 of an exemplary embodiment.

In FIG. 5, the positive electrode 11, the first separator 13a, the negative electrode 12, and the second separator 13b are superposed in this order from the inner side of winding and are rolled up to prepare the electrode assembly 14. The first separator 13a is wound off from the separator roll 54 and is wound up together with the positive electrode 11, the negative electrode 12, and the second separator 13b while the tension of the first separator 13a is controlled by dancer rollers 52.

When the first separator 13a is wound, part of the first separator 13a is stretched in the winding direction γ by a stretching section 50a and another stretching section 50b to be plastically deformed to thereby form the plastically deformed region 41. The first separator 13a has ductility; however, once the first separator 13a is stretched by a force larger than the yield point, it does not return and results in plastic deformation. The plastically deformed region 41, in which plastic deformation has occurred, has a puncture strength larger than that of the normal region 40, in which plastic deformation has not occurred. On the other hand, the normal region 40 exhibits a larger percent elongation than that of the plastically deformed region 41. Unlike thermal fusion or the like, pores of the separator 13 are not filled in the plastically deformed region 41, and the plastically deformed region 41 has favorable electrolyte permeability.

Figure 6:
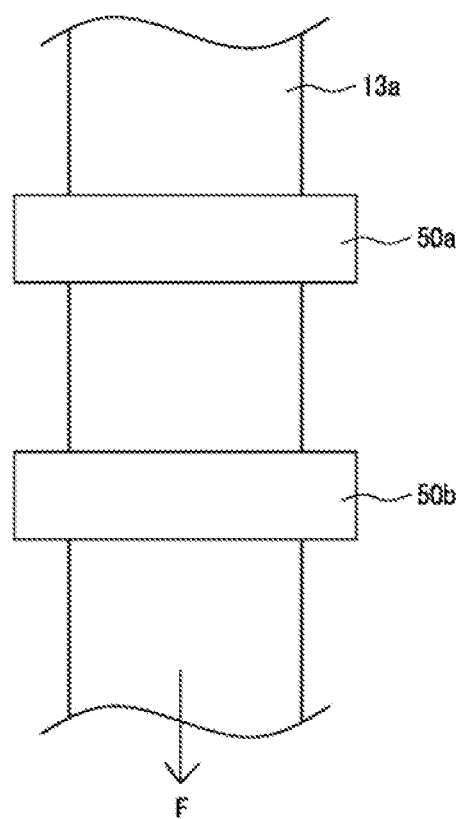
FIG. 6 is a side view illustrating the configuration of a stretching section of the winding device shown in FIG. 5.

FIG. 6 is a side view illustrating the configuration of the stretching section 50a and the stretching section 50b of the winding device shown in FIG. 5. The first separator 13a flows from the upside to the underside in FIG. 6, in other words, from the separator roll 54 side to the electrode assembly 14 side (hereinafter, sometimes referred to as the flow direction F of the first separator 13a). The configurations of the stretching section 50a and the stretching section 50b are not particularly limited as long as the first separator 13a between them is elongated. The stretching section 50a and the stretching section 50b each may be a nip roll, for example. The stretching section 50a and the stretching section 50b each sandwich the first separator 13a in the direction vertical to the flow direction F of the first separator 13a. When the nip roll of the stretching section 50b is allowed to rotate faster in the flow direction F of the first separator 13a than the nip roll of the stretching section 50a, the first separator 13a between the stretching sections 50a and 50b can be elongated. The length of the plastically deformed region 41 in the winding direction γ can be varied by adjusting the distance between the stretching sections 50a and 50b. Thus, the plastically deformed region 41 can be formed at any position in the first separator 13a. The same process can be applied to the case where the plastically deformed region 41 is formed at a specific position in the second separator 13b.

Figure 7:
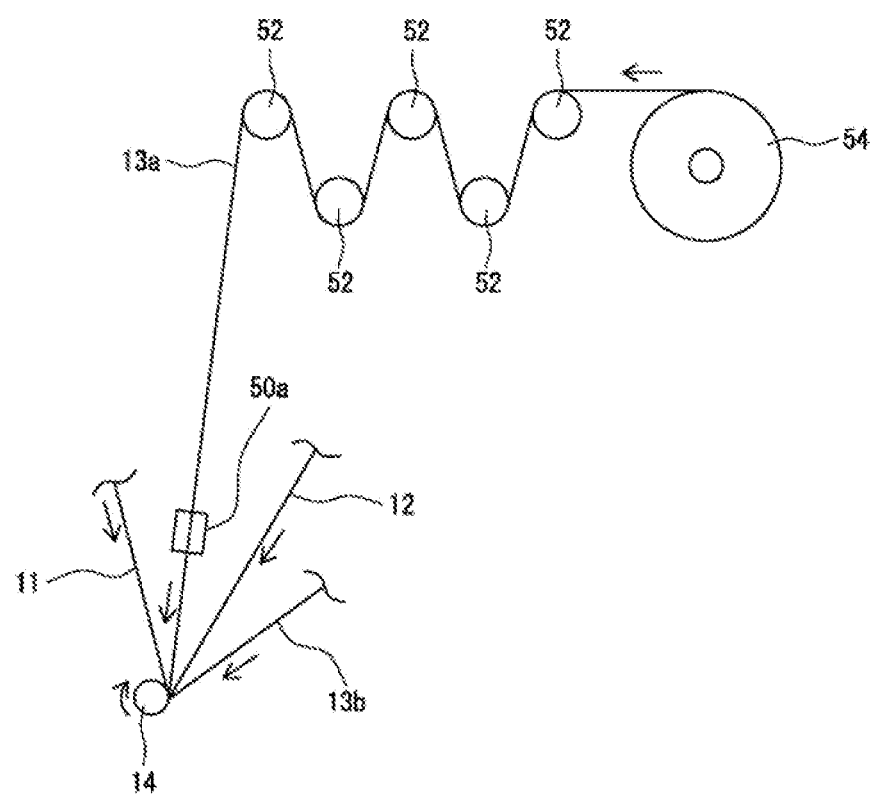
FIG. 7 is a view showing another exemplary embodiment, the view corresponding to FIG. 5.

Next, another exemplary embodiment will be described with reference to FIG. 7. In the example shown in FIG. 7, the first separator 13a is stretched between the stretching section 50a and the electrode assembly 14 that is being prepared so that the first separator 13a is plastically deformed to form the plastically deformed region 41. The first separator 13a can be elongated by, for example, setting the rotating speed of the nip roll of the stretching section 50a lower than the winding speed of the electrode assembly 14.

The negative electrode 12 in the present embodiment is as follows, for example.

The negative electrode 12 has a beltlike negative electrode current collector and a negative electrode mixture layer formed on at least one face of the negative electrode current collector. The negative electrode mixture layer is preferably formed on each of both face of the negative electrode current collector. As the negative electrode current collector, foil of a metal, such as copper, a film with such a metal disposed as an outer layer, or the like can be used. A suitable negative electrode current collector is metal foil including copper or a copper alloy as the main component. The thickness of the negative electrode current collector is, for example, 5 μm to 30 μm.

On each of both face of the negative electrode current collector, the negative electrode mixture layer is preferably formed in the whole area, the negative electrode-exposed region described later excluded. The negative electrode mixture layer preferably includes a negative electrode active material and a binder. The negative electrode 12 is prepared by, for example, applying a negative electrode slurry including the negative electrode active material, the binder, water, and others to both faces of the negative electrode current collector, and then drying and pressing the resultant.

The negative electrode active material is not particularly limited as long as it can reversibly intercalate and deintercalate lithium ions, and examples thereof include carbon materials such as natural graphite and artificial graphite, metal that can be alloyed with lithium, such as Si and Sn, and an alloy and oxide containing any of these metals. Examples of the binder included in the negative electrode mixture layer include fluororesins, such as polytetrafluoroethylene (PTFE) and poly(vinylidene fluoride)(PVdF), polyacrylonitrile (PAN), polyimide (PI), acrylic resins, and polyolefin resins. When the negative electrode slurry is prepared with an aqueous medium, styrene-butadiene rubber (SBR), CMC or a salt thereof polyacrylic acid or a salt thereof polyvinyl alcohol, or the like can be used. These may be used singly or in combinations of two or more thereof.

In the negative electrode 12, a negative electrode-exposed region is provided, in which the surface of the negative electrode current collector is exposed. The negative electrode-exposed region is a region to which a negative electrode lead 21 is connected, and also is a region where the surface of the negative electrode current collector is not covered with the negative electrode mixture layer. The negative electrode lead 21 is connected to the negative electrode-exposed region by, for example, ultrasonic welding. The constituent material for the negative electrode lead 21 is not particularly limited as long as it has conductivity. The negative electrode lead 21 is preferably made of metal including nickel or copper as the main component or metal including both nickel and copper.

For example, the negative electrode-exposed region is provided at the inner end of the negative electrode 12 in the longitudinal direction γ. In this case, the negative electrode lead 21 is positioned at the center in the radial direction β of the electrode assembly 14 while protruding from the end face in the winding axial direction α as shown in FIG. 2. A protection member 35 may be attached to the surface of the negative electrode lead 21. The negative electrode-exposed region is provided by, for example, intermittent application in which no negative electrode slurry is applied to part of the negative electrode current collector. The position of the negative electrode lead 21 arranged is not limited to that in the illustration shown in FIG. 2, and the negative electrode lead 21 may be provided at the outer end of the negative electrode 12. The negative electrode lead 21 may be provided at each of the inner end and the outer end, and in this case, the current collectivity is improved. An exposed region at the outer end of the negative electrode 12 may be contact with the inner periphery surface of the package 16 to thereby electrically connect the outer end of the negative electrode 12 to the package 16 without using any negative electrode lead 21.

In the first separator 13a or the second separator 13b, a plastically deformed region 41 may be formed at a position facing a corner of the negative electrode 12, for example, the inner end or the outer end of the negative electrode 12 (corresponding to the corners A), the ends of the negative electrode mixture layers (corresponding to the corners B), the lateral ends of the protection member 35 (corresponding to the corners C), or the lateral ends of the negative electrode lead 21 (corresponding to the corners D).

EXAMPLES

Hereinafter, the present disclosure will be described in more details by way of Examples, but the present disclosure is not limited thereto.

Example

[Preparation of Positive Electrode]

As a positive electrode active material, a lithium nickel cobalt oxide containing aluminum represented by $LiNi_{0.88}Co_{0.09}Al_{0.03}O_2$ was used. 100 parts by mass of $LiNi_{0.88}Co_{0.09}Al_{0.03}O_2$, 1.0 part by mass of acetylene black, and 0.9 part by mass of poly(vinylidene fluoride) (PVDF) were mixed, and an adequate amount of N-methyl-2-pyrrolidone (NMP) was added thereto to prepare a positive electrode slurry. Then the positive electrode slurry was applied to both faces of a strip of aluminum foil having a thickness of 15 μm as a positive electrode current collector, and the coatings were dried by heating at 100° C. to 150° C. The dried coatings were compressed with a roller to a thickness of 0.144 mm, and then cut to 57.6 mm wide and 679 mm long, to thereby prepare a positive electrode having a positive electrode current collector and positive electrode mixture layers formed on both faces thereof.

[Preparation of Negative Electrode]

95 parts by mass of graphite powder, 5 parts by mass of Si oxide, 1 part by mass of carboxymethyl cellulose (CMC), and 1 part by mass of a styrene-butadiene rubber were mixed, and an adequate amount of water was added thereto to prepare a negative electrode slurry. Then the negative electrode slurry was applied to both faces of a strip of copper foil having a thickness of 8 μm as a negative electrode current collector, and the coatings were dried. The dried coatings were compressed with a roller to a thickness of 0.164 mm, and then cut to 58.6 mm wide and 662 mm long, to thereby prepare a negative electrode having a negative electrode current collector and negative electrode mixture layers formed on both faces thereof.

[Separator]

The first separator used was the same as the second separator used. The separator used was made of polyolefin resin and had a thickness of 14 μm and an aramid coating formed on one face thereof. The physical properties of the separator used were as follows: strength at break of the normal region, 135 MPa; percent elongation in the winding axial direction α, 78%; and puncture strength, 413 gf.

[Preparation of Electrolyte]

3 parts by mass of vinylene carbonate (VC) was added to 100 parts by mass of a mixed medium composed of ethylene carbonate (EC), ethyl methyl carbonate (EMC), and dimethyl carbonate (DMC) (volume ratio EC:EMC:DMC=20: 5:75). $LiPF_6$ was dissolved in the resulting mixed medium to a concentration of 1.4 mol/L, to thereby prepare an electrolyte.

[Impact Test]

An aluminum-made positive electrode lead was attached to a positive electrode-exposed region provided at almost the longitudinal center of the positive electrode current collector. A protection member having a PP-made substrate was attached to the surface of the positive electrode lead so as to overlap the positive electrode mixture layer. A nickel/copper/nickel-made negative electrode lead was attached to the negative electrode-exposed region provided at the inner end of the negative electrode current collector. The positive electrode, the first separator, the negative electrode, and the second separator were superposed in this order from the inner side of winding and then wound, and ten wound-type electrode assemblies were thus prepared. For winding the electrode assembly, a pair of nip rolls was arranged between each of the separator rolls of the first separator and the second separator and the electrode assembly, and the first separator and the second separator were each introduced between the nip rolls so as to apply a load of 12 N per 10 mm of the wide of the separator so that each separator was stretched to thereby form a plastically deformed region. The plastically deformed region was formed at the position to cover a protection member tape for the positive electrode tab. The puncture strength of a plastically deformed region that was separately formed by plastically deforming the separator under the same conditions was 436 gf. Insulating plates were respectively arranged on and under the electrode assembly, and the resulting electrode assembly was housed in a battery case. Then, the negative electrode lead was welded to the bottom of the battery case, and the positive electrode lead was welded to a sealing assembly having an inner pressure-actuated safety valve. Then, the electrolyte was injected into the battery case by the pressure-reducing method, and the open end of the battery case was then crimped to join the battery case to the sealing assembly with a gasket interposed therebetween to thereby close the open end of the battery case. Thus, ten cylindrical secondary batteries were prepared.

For the case of SOC 100%, five batteries prepared were used to carry out impact test. In an atmosphere at 25° C., each of batteries were charged to 4.2V by constant current charge at 990 mA (0.3 hour rate) and then charged at a constant voltage of 4.2V to a cutoff current of 66 mA. The test was then carried out, in which the weight of a weight was changed to 9.6 kg among the items of the T6 impact test under the conditions of the UN transportation test (a metal round bar having a diameter of 15.8 mm is put at the center of a battery, and a weight of 9.1 kg is fallen from a height of 61 cm). In the case where none of the five batteries resulted in decrease in the voltage by 0.5 V or more compared to the voltage before test, the batteries were rated as OK, and the batteries in other cases were rated as NG.

For the case of SOC 50%, five batteries prepared were used to carry out impact test. In an atmosphere at 25° C., each of batteries were charged by constant current charge at 990 mA (0.3 hour rate), and the charge was stopped at the time when the charge capacity reached 1.7 Ah. The test was carried out, in which the weight of a weight was changed to 9.6 kg among the items of the T6 impact test under the conditions of the UN transportation test (a metal round bar having a diameter of 15.8 mm is put at the center of a battery, and a weight of 9.1 kg is fallen from a height of 61 cm). In the case where none of the five batteries resulted in decrease in the voltage by 0.5 V or more compared to the voltage before test, the batteries were rated as OK, and the batteries in other cases were rated as NG.

Comparative Example 1

Wound-type electrode assemblies were prepared in the same manner as in Example 1, except that a separator having a puncture strength larger than that of the separator in Example 1 was used as each of the first separator and the second separator, and that any plastically deformed region was not formed in the first separator or the second separator. The physical properties of the separator used were as follows: the breaking strength of the normal region, 145 MPa; the percentage elongation in the winding axial direction α, 50%; and the puncture strength 456 gf.

Comparative Example 2

Wound-type electrode assemblies were prepared in the same manner as in Example 1, except that any plastically deformed region was not formed in the first separator or the second separator.

The results of evaluations in Examples and Comparative Examples are shown in Table 1.

TABLE 1

| | Impact Test (SOC 100%) | Impact Test (SOC 50%) |
|---|---|---|
| Example 1 | OK | OK |
| Comparative Example 1 | OK | NG |
| Comparative Example 2 | NG | OK |

The battery of Example 1, in which a plastically deformed region was formed in each of the first separator and the second separator, was rated as OK in the impact test in both of the state of full charge (SOC 100%) and the state of non-full charge (SOC 50%). On the other hand, the batteries of Comparative Examples 1 and 2, in which no plastically deformed region was formed in the separators, were rated as NG in the impact test in either one of the state of full charge or the state of non-full charge. The battery of Comparative Example 1, in which a separator having a larger puncture strength was used, was rated as NG in the impact test in the state of non-fill charge, and the battery of Comparative Example 2, in which a separator having a smaller puncture strength was used, was rated as NG in the impact test in the state of full charge. Thus, it was confirmed that a non-aqueous electrolyte secondary battery in which thermal runaway thereof due to impact from the outside is suppressed both in a state of full charge and that of non-foil charge can be obtained by using a separator having a normal region and a plastically deformed region having a puncture strength larger than that of the normal region.

REFERENCE SIGNS LIST

10 non-aqueous electrolyte secondary battery
11 positive electrode
12 negative electrode
13 separator
14 electrode assembly
15 battery case
16 package
17 sealing assembly
18,19 insulating plate
20 positive electrode lead
21 negative electrode lead
22 projecting portion
23 filter
24 lower vent member
25 insulating member
26 upper vent member
27 cap
28 gasket
30 positive electrode current collector
31 positive electrode mixture layer
35 protection member
40 normal region
41, 41A, 41B, 41C, 41D plastically deformed region
50a, 50b stretching section
52 dancer roller
54 separator roll

The invention claimed is:
1. A non-aqueous electrolyte secondary battery comprising:
a wound-type electrode assembly including a positive electrode and a negative electrode wound together with a separator interposed therebetween; and
a battery case housing the electrode assembly, wherein the positive electrode has a positive electrode current collector and a positive electrode mixture layer formed on at least one face of the positive electrode current collector, and the separator has a normal region and a plastically deformed region having a puncture strength larger than that of the normal region, wherein the plastically deformed region comprises part of the separator stretched in a winding direction when winding the positive electrode and the negative electrode together with the separator interposed therebetween, to thereby plastically deform the part of the separator.

2. The non-aqueous electrolyte secondary battery according to claim 1, wherein the separator has the plastically deformed region at a position facing at least one of an inner end and an outer end of the positive electrode.

3. The non-aqueous electrolyte secondary battery according to claim 1, wherein the separator has the plastically deformed region at a position facing at least one of an inner end and an outer end of the positive electrode mixture layer.

4. The non-aqueous electrolyte secondary battery according to claim 1, wherein the non-aqueous electrolyte secondary battery further comprises:
a conductive positive electrode lead connected to a positive electrode-exposed region in which no positive electrode mixture layer is formed on the face of the positive electrode, and
a protection member attached to a surface of the positive electrode lead,
wherein the separator has the plastically deformed region at a position facing at least one end of both lateral ends of the protection member and both lateral ends of the positive electrode lead.

5. The non-aqueous electrolyte secondary battery according to claim 1, wherein the separator includes a polyolefin resin.

6. A method for producing a non-aqueous electrolyte secondary battery comprising wound-type electrode assembly including a positive electrode and a negative electrode wound together with a separator interposed therebetween; and a battery case housing the electrode assembly, the method including
stretching part of the separator in a winding direction when winding the positive electrode and the negative electrode together with the separator interposed therebetween, such that the separator has a normal region and a plastically deformed region having a puncture strength larger than that of the normal region,
wherein the plastically deformed region comprises said part of the separator stretched in the winding direction when winding the positive electrode and the negative electrode together with the separator interposed therebetween.

7. The non-aqueous electrolyte secondary battery according to claim 1, wherein
the separator is an ion-permeable porous sheet, and
the plastically deformed region comprises pores configured to exhibit electrolyte permeability.

8. The non-aqueous electrolyte secondary battery according to claim 1, wherein
the plastically deformed region exhibits directionality of plastic deformation with respect to the winding direction of the wound-type electrode assembly.

* * * * *